UNITED STATES PATENT OFFICE.

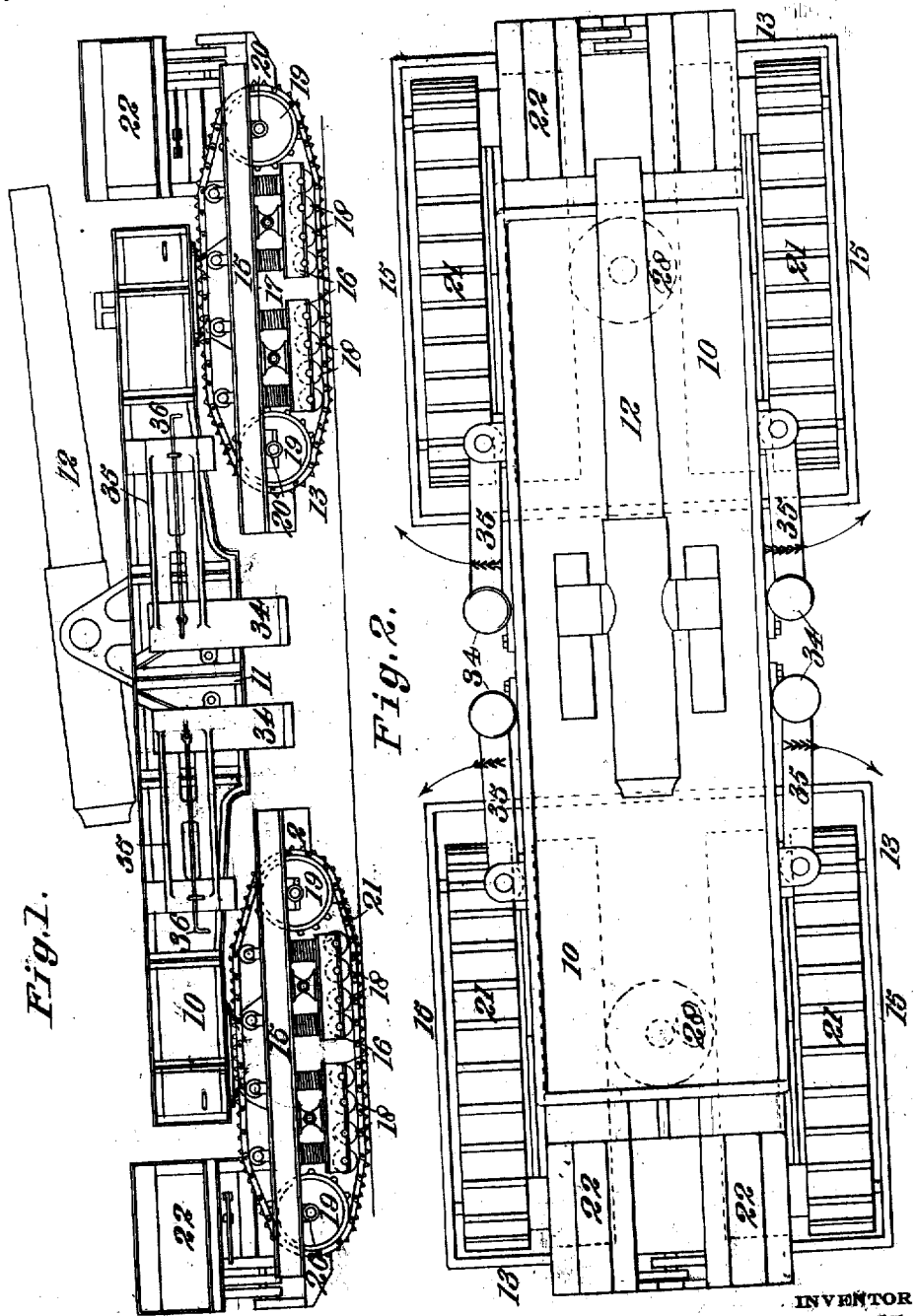

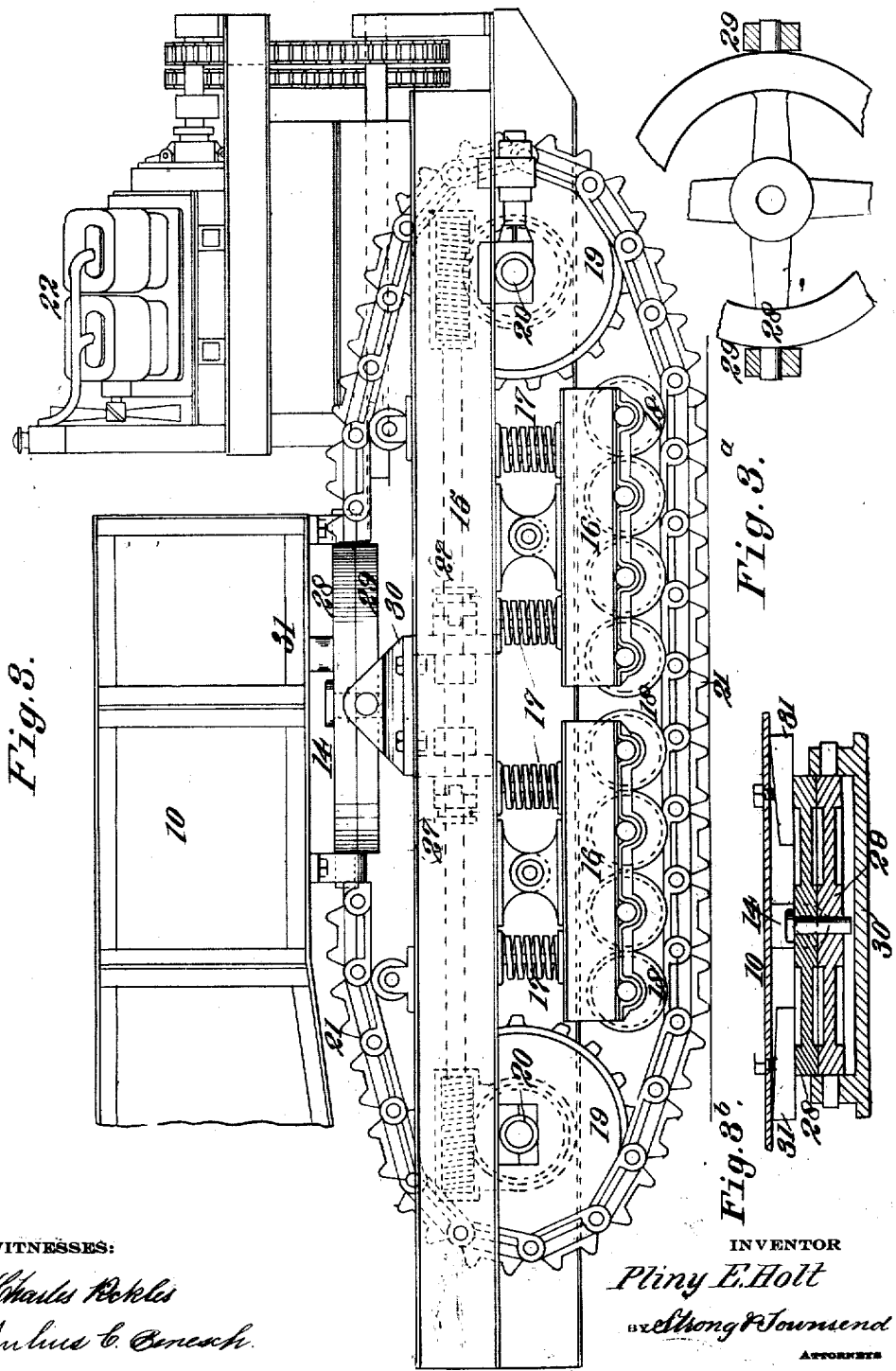

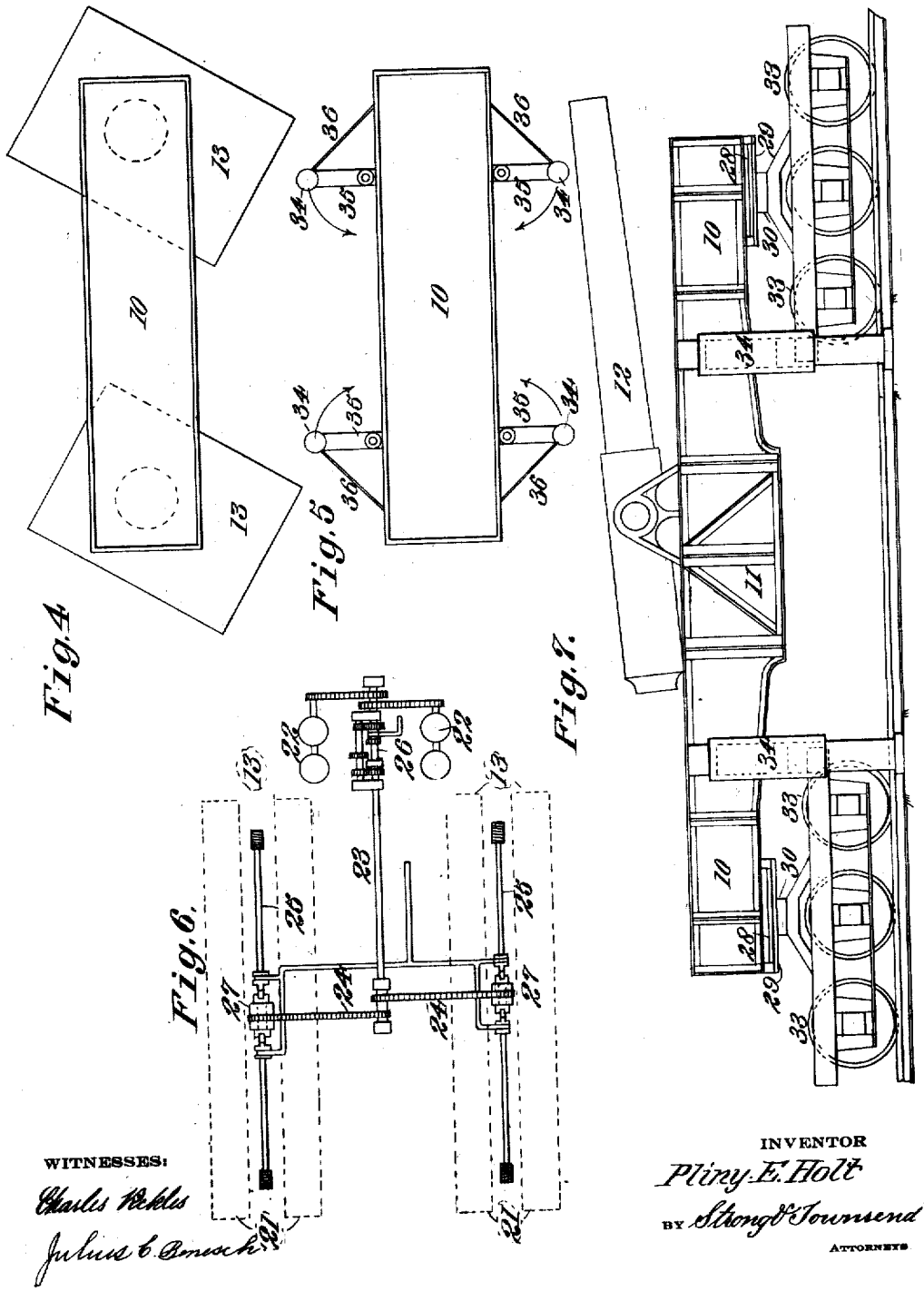

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

GUN-CARRIAGE.

1,344,397.  Specification of Letters Patent.  Patented June 22, 1920.

Application filed May 14, 1917.  Serial No. 168,386.

*To all whom it may concern:*

Be it known that I, PLINY E. HOLT, a citizen of the United States, residing at Stockton, in the county of San Joaquin and State of California, have invented new and useful Improvements in Gun-Carriages, of which the following is a specification.

This invention relates to gun carriages and mountings for heavy artillery, and has for its object to provide novel and practical self-propelled means for mounting the gun and transporting it, so that it may be propelled and steered and conveniently moved over any character of ground however rough or swampy; supporting means comprising specially designed tractor trucks of the self-laying track type; such tractor truck mechanisms being readily removable and replaceable by railway truck mechanism to enable the gun carriage with its gun to be run over rails of an ordinary railway. In short, I purpose rendering heavy guns which heretofore could only be moved, if at all, upon established railways, capable of universal application in general field work; the gun by my invention being capable of movement over ordinary highways, or over ground where tnere are no roads at all. In other words, increasing mobility of heavy artillery.

One form which my invention may assume is exemplified in the following description and illustrated in the accompanying drawings, in which—

Figure 1 shows a side elevation of a device embodying my invention, the gun carriage being mounted upon self-propelled truck mechanism of the self-laying track type.

Fig. 2 shows a plan view of the same.

Fig. 3 shows a side elevation of the end portion of the same. Figs. 3ª and 3ᵇ show details of the pivotal and rocking connections between the truck mechanism and the main frame.

Fig. 4 shows a diagram in plan, illustrating the turning of the truck mechanism.

Fig. 5 shows a diagram in plan, illustrating the lifting jacks for the main frame whereby to assist in interchanging the trucks.

Fig. 6 shows a diagram in plan of the driving connections between the motor and self-laying track mechanism of one of the trucks.

Fig. 7 shows a side elevation of the gun carriage mounted upon railway trucks.

The drawings show merely one example of a practical method of carrying out my invention, the device there shown comprising a gun carriage frame 10 having a trussed central portion 11 forming a support for the heavy cannon or other ordnance 12. At each end of the main frame 10 is a truck mechanism 13, pivotally connected at its center to the frame 10 by means of a king pin 14. Interchangeable truck mechanism is provided, one set of the self-laying track type for field and road work and the other set for railway use.

The self-laying track type or tractor truck mechanisms are shown in Figs. 1 to 3, inclusive, and each comprises a frame 15 supported at each side upon two sets of roller trucks, the latter comprising each a pair of frames 16, each pivotally connected at its center to the main truck frame 15 and carrying a spring 17 at either end to support the latter. The two frames 16 of each truck are preferably disconnected and are adapted to rock about their pivotal connections independently of each other. A series of rollers 18 is journaled on each of the frames 16.

At each side of the main frame of the truck mechanism, and near each end thereof, is a spaced pair of driving and supporting sprocket wheels 19 fixed upon an axle 20, the latter journaled on the frame 15. Over oppositely alined sprocket wheels 19 an endless, flexible track 21 operates, passing beneath the rollers 18 and forming a track therefor. Thus at each side of each truck frame is a pair of endless, flexible tracks of the character described, each of considerable width and their combined treads forming a maximum of supporting area for the heavy load carried thereby.

All of the sprocket wheels 19 are power driven by means of a motor 22, mounted upon the outer end of the truck frame and having a driving conection 23 running to the center of said frame from which connections 24 extend to counter-driving shafts 25, one at each side, the opposite ends of the counter-driving shafts being operatively connected to the axles of the sprocket wheels. Suitable change-speed gears 26 may be introduced in the driving connection and controllable clutch mechanism 27 is preferably employed by which a differential movement is obtained between the tracks at opposite sides and steering is effected. The truck mechanism at the front and the rear may be driven in either direction, owing to the fact that all the sprocket wheels 19 are positively driven. Opposite truck mechanisms are disconnected and are separately operated and controlled, so that very sharp turns are possible, as indicated in Fig. 4. Thus the carriage may be moved fore, aft, sidewise, obliquely, or in any direction desired, as is necessary for effective military work.

The general type of tractor employed at front and rear of the gun carriage is illustrated in the Norelius Patent #1,184,705, dated May 23, 1916, to which special reference is hereby made for a fuller and complete understanding of the operation of the friction clutches and the manner and method by which one of these trucks is steered to right or left. Of course in the present instance there is a double row of endless, self-laying track members on each side of each truck; also each front and rear sprocket 19 of each truck is independently driven for fore and aft movement, since power is always applied for traction to the rearmost sprocket. It is understood that each truck, which in itself constitutes an independent traction engine, is a practical counter-part of the other. Each is self-propelled and each is independently turnable in either direction. This independent control of the two supporting elements for a big gun of this character, is one of the chief features of the invention, because it insures maximum mobility for a big gun of this character and enables it to be turned and pointed in any direction in a minimum of space. The importance of this can readily be appreciated when one considers the immense weight of these heavy guns.

By the foregoing construction of mounting the longitudinal gun frame or carriage which supports the big gun itself upon self-propelled and universally movable traction devices the gun is given universality of movement, whereby it may turn, back-up, go into and out of ditches and depressions in the roadway or other hummocks, shift bodily sidewise in parallelism with its previous direction of travel, or move obliquely; all factors of the greatest practical importance in modern military tactics.

Another important feature is the universal mounting of each end of the gun carriage on its particular traction truck, so that the greatest degree of flexibility consistent with stability is afforded.

The connection between the truck mechanism and the main frame 10, as here shown, includes a gimbal ring to permit rocking movement of the truck mechanism about longitudinal and transverse axes. This gimbal ring comprises an upper circle iron 28 pivoted to the main frame for rocking movement about an axis, longitudinally thereof, and a lower circle iron 29 pivoted to a transverse bolster 30 on the truck frame for rocking movement about an axis transversely of the truck frame, the king pin 14 pivotally connecting the two rings together.

When the carriage is mounted on roller trucks there is no necessity for the rocking movement about the longitudinal axis and movement at this time may endanger the stability of the vehicle. Therefore, wedge blocks 31 may be inserted between the upper ring and the main frame 10 to prevent such movement.

Also, when the gun is being transported on its traction trucks 13, the rear end of the gun carriage should be blocked-up upon the rearmost traction truck, so that the gun and its carriage will not be permitted to oscillate to a degree to endanger the stability of the outfit. When the rear end is thus blocked-up the gun and its carriage have practically a three-point suspension, the front traction truck forming a single point of support as it were for the front end of the gun carriage. If the movement of the gun carriage is reversed without turning the vehicle around, the block 31 when the rear end of the gun carriage is removed is placed under the opposite end; the traction truck which was formerly the leading truck being now the rear one.

The railway trucks include flanged wheels 33 and conform to accepted constructions of such devices. For convenience in effecting the interchange from tractor to railway truck supports hydraulic or other jacks 34 are employed; a plurality being provided at either side, each being carried by a swinging arm 35 pivotally connected to the main frame and foldable against the side thereof. When moved outwardly, the jacks clear the truck mechanisms and the swinging arms 35 are held in rigid position by brace-bars 36. When the transfer of the truck mechanisms has been effected, the arms are swung inwardly toward each other, bringing the jacks against the side of the vehicle near the middle portion thereof, so that they do not interfere with the turning movement of the truck mechanisms.

Various changes in the construction and arrangement of the several parts herein shown and described may be employed without departing from the spirit of my invention as disclosed in the appended claims.

Having thus described my invention, what I claim and desire to secure by Letters Patent is—

1. A gun carriage comprising a main frame and a self-propelled tractor truck mechanism at each end supporting the same, each of said truck mechanisms being pivotally connected for turning movement relative to the frame, the connection being such as to permit rocking movement of the truck mechanisms about transversely and longitudinally extending axes.

2. A gun carriage comprising a main frame, independently operable tractor truck mechanism at each end thereof, and a self-laying track for each of the truck mechanisms.

3. A gun carriage comprising a main frame, tractor truck mechanism at each end thereof, a self-laying track for each of the truck mechanisms, and a motor carried by each truck mechanism for propelling the self-laying track.

4. A gun carriage comprising a substantially rigid main frame, tractor truck mechanism pivotally connected at each end thereof, each of said truck mechanisms comprising self-propelled, self-laying tracks at each side, and means for controlling the operation of the tracks to steer the trucks.

5. A gun carriage comprising a substantially rigid main frame, tractor truck mechanism pivotally connected at each end thereof, each of said truck mechanisms comprising self-propelled, self-laying tracks at each side, and means for controlling the operation of the tracks to steer the trucks, the trucks at opposite ends being entirely disconnected and independently operated and controlled.

6. A gun carriage comprising a substantially rigid gun carrying main frame, a tractor truck mechanism pivotally connected at each end thereof, said truck mechanisms comprising each a frame pivoted near its center to the gun carriage frame, a roller-carrying frame yieldingly supporting the main truck frame at each side, track driving and idler wheels in connection with each roller-carrying frame, an endless, self-laying track extending around said driving and idler wheels upon which the rollers operate, and a motor carried by the truck frame and operatively connected to the track driving wheels.

7. A gun carriage comprising a substantially rigid gun carrying main frame, a tractor truck mechanism pivotally connected at each end thereof, said truck mechanisms comprising each a frame pivoted near its center to the gun carriage frame, a roller-carrying frame yieldingly supporting the main truck frame at each side, track driving and idler wheels in connection with each roller-carrying frame, an endless, self-laying track extending around said driving and idler wheels upon which the rollers operate, and a motor carried by the main truck frame and operatively connected to the track driving wheels, the driving connections between the motor and track including controllable means to vary the speed of travel of the tracks at opposite sides, whereby to steer the truck mechanism.

8. A gun carriage comprising a substantially rigid gun carrying main frame, a self-propelled tractor truck mechanism pivotally connected at each end thereof, said truck mechanisms each comprising a main truck frame, front and rear sprocket wheels at each side thereof, a motor carried by the truck frame operatively connected with both the front and rear sprocket wheels, an endless, flexible, self-laying track extending around the front and rear sprocket wheels at each side, and roller trucks operating upon the lower run of said track supporting the truck frame, said roller trucks being mounted for rocking movement independent of the truck frame.

9. In a gun carriage, a main frame, and independent tractor truck mechanisms each embodying a motor and traction members, said truck mechanisms being pivotally and detachably connected to opposite ends of the main frame and interchangeable with railway truck mechanism.

10. In a gun carriage, a main frame, independent tractor truck mechanisms each embodying a motor and traction members and one pivotally and detachably connected to each end of the main frame, said truck mechanisms being independently controlled and interchangeable with railway truck mechanism, and lifting means carried by the main frame for temporarily supporting the same to permit the truck mechanisms to be removed and replaced.

11. In a gun carriage, a main frame, independent tractor truck mechanisms each embodying a motor and traction members and one pivotally and detachably connected to each end of the main frame, said truck mechanisms being independently controlled and interchangeable with railway truck mechanism, and lifting means carried by the main frame for temporarily supporting the same to permit the truck mechanisms to be removed and replaced, said lifting means comprising jacks carried by swinging arms connected to the main frame and foldable against the side thereof near the middle portion clear of the truck mechanisms.

12. A big gun mounting, comprising a substantially rigid longitudinal main frame on which the gun is mounted, a pair of self-laying-track traction devices, one supporting the one end of the gun frame and the other the opposite end of the gun frame, said traction devices being independently propelled and independently turnable beneath the gun carriage to right or left.

13. A big gun mounting, which consists in the combination of a longitudinal gun carriage frame supporting the gun and mobile traction members pivotally connected to the gun carriage frame, and connections for propelling the traction members in any desired direction, whereby the gun frame may be moved forward or backward, sidewise, obliquely, or be turned upon an axis lying within the length of the gun carriage.

In testimony whereof I have hereunto set my hand in the presence of two subscribing witnesses.

PLINY E. HOLT.

Witnesses:
ROBERT E. MANN,
FRANK H. CHISHOLM.